US008486474B2

(12) United States Patent
Sarir et al.

(10) Patent No.: US 8,486,474 B2
(45) **Date of Patent: *Jul. 16, 2013**

(54) COMPOSITIONS AND PROCESSES FOR IMPROVING CARBONATATION CLARIFICATION OF SUGAR LIQUORS AND SYRUPS

(75) Inventors: Emmanuel M. Sarir, Los Angeles, CA (US); James Bushong, Collegeville, PA (US)

(73) Assignee: Carbo-UA Limited, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,082

(22) Filed: Nov. 9, 2010

(65) Prior Publication Data

US 2011/0165303 A1 Jul. 7, 2011

Related U.S. Application Data

(60) Provisional application No. 61/260,166, filed on Nov. 11, 2009.

(51) Int. Cl.
*A23L 1/22* (2006.01)

(52) U.S. Cl.
USPC .......................................................... 426/533

(58) Field of Classification Search
None
See application file for complete search history.

(56) References Cited

U.S. PATENT DOCUMENTS

| | | | | |
|---|---|---|---|---|
| 1,646,079 A | | 10/1927 | Battelle | |
| 1,788,466 A | | 1/1931 | Lourens | |
| 1,815,276 A | | 7/1931 | Schwieger | |
| 2,067,362 A | | 1/1937 | Von Stietz | |
| 2,104,959 A | | 1/1938 | von Stietz | |
| 2,170,601 A | | 8/1939 | Wilson et al. | |
| 2,249,920 A | | 7/1941 | Taussig et al. | |
| 2,261,920 A | | 11/1941 | Graff et al. | |
| 2,430,262 A | * | 11/1947 | Vincent | 127/46.1 |
| 2,672,428 A | * | 3/1954 | Sklar | 127/46.1 |
| 2,829,986 A | | 4/1958 | Ehrhart | |
| 2,977,253 A | | 3/1961 | Grandadam et al. | |
| 3,097,114 A | | 7/1963 | Assalini | |
| 3,166,442 A | | 1/1965 | Duke | |
| 3,248,264 A | | 4/1966 | Welch | |
| 3,420,709 A | | 1/1969 | Barrett, Jr. et al. | |
| 3,539,393 A | | 11/1970 | Silva et al. | |
| 3,698,951 A | | 10/1972 | Bennett | |
| 3,806,364 A | * | 4/1974 | Gasco | 127/48 |
| 3,853,616 A | | 12/1974 | Rundell et al. | |
| 3,909,287 A | | 9/1975 | Rundell et al. | |
| 3,973,986 A | | 8/1976 | Schoenrock et al. | |
| 4,101,338 A | | 7/1978 | Rapaport et al. | |
| 4,196,017 A | | 4/1980 | Melville et al. | |
| 4,247,340 A | | 1/1981 | Cartier | |
| 4,382,823 A | | 5/1983 | Gudnason | |
| 4,478,645 A | | 10/1984 | Gudnason | |
| 4,502,890 A | * | 3/1985 | Urbanic | 127/46.2 |
| 5,262,328 A | | 11/1993 | Clarke et al. | |
| 5,281,279 A | | 1/1994 | Gil et al. | |
| 5,865,899 A | | 2/1999 | Theoleyre et al. | |
| 5,891,254 A | | 4/1999 | Coville et al. | |
| 5,932,016 A | | 8/1999 | Paananen et al. | |
| 6,146,465 A | | 11/2000 | Xavier et al. | |
| 6,159,302 A | * | 12/2000 | Xavier et al. | 127/57 |
| 6,368,413 B1 | | 4/2002 | Charlet et al. | |
| 6,375,751 B2 | | 4/2002 | Reisig et al. | |
| 2001/0001178 A1 | | 5/2001 | Donovan et al. | |
| 2002/0011246 A1 | | 1/2002 | Reisig et al. | |
| 2005/0229813 A1 | | 10/2005 | Dionisi et al. | |
| 2009/0050135 A1 | | 2/2009 | Zschau et al. | |

FOREIGN PATENT DOCUMENTS

| | | |
|---|---|---|
| CN | 1609234 A | 4/2005 |
| CN | 101003842 A | 7/2007 |

OTHER PUBLICATIONS

U.S. Appl. No. 12/893,514 Office Action dated Sep. 27, 2011.
Cane Sugar Handbook, 12th Ed., pp. 454-455.
Cane Sugar Handbook, 12th Ed., pp. 463-464.
Cane Sugar Handbook, 12th Ed., pp. 634.
Abdel-Razig et al., Effect of Addition of Separan at Different Concentrations as a Flocculants on Quality of Sugar Cane Juice, International Journal of Biological and Life Sciences, 2010, pp. 88-91, vol. 6, No. 2.
International Search Report of PCT/US10/56381 dated Feb. 28, 2011.
International Preliminary Report on Patentability issued in Application No. PCT/US2010/051501 dated May 15, 2012.
International Search Report issued in Application No. PCT/US2010/051501 dated Nov. 30, 2010.

(Continued)

*Primary Examiner* — Melvin C Mayes
*Assistant Examiner* — Stefanie Cohen
(74) *Attorney, Agent, or Firm* — Venable LLP; Keith G. Haddaway; Robert Kinberg

(57) ABSTRACT

This invention relates to compositions and processes for improving the carbonatation clarification of sugar liquors and syrups. The improved processes involve adding compositions to a sugar liquor directly in the carbonated liquor holding tank (after the final carbonatation saturator), upstream of the carbonated liquor holding tank but downstream of the final stage Carbonatation saturator, before filtration of the carbonated liquor, or at any stage in the sugar purification process. The compositions provided in this invention are mixed intimately into the sugar liquors or syrups, and allowed sufficient time to react to impart an improvement in the clarified liquor obtained therefrom. Compositions can include combinations of one or more of a particulate sulfur reagent, particulate phosphorous reagent, particulate aluminum reagent, silica reagent, particulate carbonaceous reagent, particulate filter aid, a polymer decolorant, and particulate ammonium reagent.

24 Claims, No Drawings

OTHER PUBLICATIONS

International Search Report issued in Application No. PCT/US2010/05638 dated Jan. 13, 2011.

International Search Report issued in Application No. PCT/US2010/061728 dated Feb. 24, 2011.

Office Action issued in U.S. Appl. No. 12/893,514 dated Jul. 26, 2012.

Office Action issued in U.S. Appl. No. 12/942,078 dated Jun. 8, 2012.

Restriction Requirement issued in U.S. Appl. No. 12/970,387 dated Mar. 8, 2012.

Written Opinion of the International Searching Authority issued in Application No. PCT/US2010/056381 dated Feb. 28, 2011.

Written Opinion of the International Searching Authority issued in Application No. PCT/US2010/061728 dated Feb. 24, 2011.

"Review of Proven Technologies Available for the Reduction of Raw Sugar Color" Proc S Afr Technol Assoc. (2008) 81, 165-183. Mahdo et al.

Office Action issued in Chinese Application 201080061053.4 dated Apr. 17, 2013, with English Translation.

English Translation of Abstracts of Documents BA and BB.

* cited by examiner

COMPOSITIONS AND PROCESSES FOR IMPROVING CARBONATATION CLARIFICATION OF SUGAR LIQUORS AND SYRUPS

BACKGROUND OF THE INVENTION

1. Field of the Invention

The present invention relates generally to a method of improving the carbonatation clarification of sugar liquors and syrups, offering compositions of matter and processes incorporating the same.

2. Related Art

Industry standards in the clarification of sugar liquors and syrups include a phosphatation or carbonatation process (Cane Sugar Handbook, $12^{th}$ Ed., pgs. 454-455). In the carbonatation clarification process, lime and carbon dioxide are added to the sugar liquors or syrups, to form a calcium carbonate crystalline solid. The formation of the calcium carbonate entraps impurities within and around the crystalline matrix, and the thus-treated liquor is passed through a filtration process to remove the calcium carbonate and the impurities removed therein. The calcium carbonate crystals also act as a filter aid, thus removing additional impurities through physical filtration means as the calcium carbonate crystals accumulate on the filters. Polymer coagulants, such as those exemplified by quaternary ammonium coagulants, may be beneficially added to enhance the color removal of the carbonatation process (Cane Sugar Handbook, $12^{th}$ Ed., pgs. 455).

More recent processes for sugar liquor and syrup clarification include those exemplified by U.S. Pat. No. 5,281,279 to Gil et al. This patent describes a process for producing refined sugar from raw sugar juices. The process includes adding a flocculent for treating raw sugar juice, wherein the flocculent is selected from the group of lime, a source of phosphate ions, polyelectrolyte, and combinations thereof. The thus treated juice is concentrated by evaporation to form a syrup, with a subsequent treatment by flocculent, then filtered, and then decolorized and de-ashed using ion-exchange resin.

In U.S. Pat. No. 4,247,340, Cartier claims a process for purifying impure sugar solutions, including simultaneous decolorization and clarification, comprising contacting the impure sugar solutions with submicroscopic ion-exchange resin in the forms of approximately spherical beads, said ion-exchange resin having diameters from about 0.01 to 1.5 microns, followed by separation of this ion-exchange resin from the sugar solution. The ion-exchange resin particles may be separated in the form of a floc, wherein the floc may be formed either from impurities in the impure sugar solution, or by adding sufficient flocculating agent in the sugar solution to flocculate all of the resin particles.

Another example of more recently proposed sugar clarification includes that of U.S. Pat. No. 5,262,328 to Clarke et al, detailing a composition for the clarification of sugar bearing juices and related products. The composition comprises a dry, powdered admixture of aluminum chloride hydroxide, lime, and activated bentonite. The composition may also include a polymer flocculating agent, such as a polyacrylamide.

SUMMARY OF THE INVENTION

The present invention provides compositions and processes for improved carbonatation clarification of sugar liquors and syrups. The process can include adding a composition to a sugar syrup, where the composition includes comprising at least one particulate sulfur reagent and one or more particulate solids selected from (A) a silica reagent, (B) a particulate phosphorous reagent, (C) a particulate carbonaceous reagent, (D) a particulate aluminum reagent, (E) a particulate filter aid, for example diatomaceous earth or perlite, (F) a polymer decolorant, and (G) a particulate ammonium reagent comprising at least one ammonium group ($NH_4$) in the chemical formula. The particulate sulfur reagent is a compound with a formula that includes at least one sulfur atom and at least three oxygen atoms. The particulate phosphorous reagent is a compound that includes at least one phosphorous atom and at least three oxygen atoms in the chemical formula. The particulate aluminum reagent is a compound that includes at least one aluminum atom and at least three oxygen atoms in the chemical formula. The particulate ammonium reagent is a compound having at least one ammonium group ($NH_4$) in the chemical formula.

In some embodiments, the composition includes a particulate sulfur reagent, a particulate carbonaceous reagent and a polymer decolorant. Embodiments of the composition include a particulate phosphorous reagent. Other embodiments of the process for treating a carbonated liquor in a sugar refining process involve adding to a carbonated liquor a composition that includes a particulate carbonaceous reagent and a polymer decolorant, and optionally one or more particulate solids selected from the group consisting of (A) a particulate sulfur reagent, (B) a silica reagent, (C) a particulate phosphorous reagent, (D) a particulate aluminum reagent, (E) a particulate filter aid, and (F) a particulate ammonium reagent. The composition can be added before filtration of the carbonated liquor. In other embodiments, the process includes adding to a sugar syrup a composition containing at least one particulate sulfur reagent before filtration of the carbonated liquor. In embodiments, the composition is added after the final carbonatation saturator. In other embodiments, the composition is added to the carbonated liquor in a carbonated liquor holding tank. The composition can be added as (a) singular components, (b) a combination of singular components and a premixture of components or (c) a pre-manufactured mixture composition.

The invention is also a composition for use in sugar refining, where the cpomposition includes at least one particulate sulfur reagent, and one or more particulate solids selected from the group consisting of (A) a silica reagent, (B) a particulate phosphorous reagent, (C) a particulate carbonaceous reagent, (D) a particulate aluminum reagent, (E) a particulate filter aid, (F) a polymer decolorant, and (G) a particulate ammonium reagent. Exemplary embodiments include a particulate carbonaceous reagent and a polymer decolorant; a particulate phosphorous reagent; a particulate carbonaceous reagent, a polymer decolorant and a particulate phosphorous reagent; or a particulate ammonium reagent.

Exemplary compositions can include from about 15% to about 50% of a polymer decolorant in the commercially available state, from about 50% to about 75% of the particulate carbonaceous reagent, and from about 1% to about 15% of the particulate sulfur reagent. Exemplary embodiments can include from about 30% to about 40% of a polymer decolorant solution, where the polymer decolorant solution that is prepared from about 10% to 85% of polymer decolorant in the "as is commercially available state" with the balance comprising water or other suitable solvent, from about 55% to about 65% of the particulate carbonaceous reagent, and from about 2% to about 12% of the particulate sulfur reagent. Embodiments can include one or more of (A) a particulate aluminum reagent in an amount ranging from about 2% to about 15%, (B) a silica reagent in an amount ranging from about 1% to about 20% of the total mixture, (C) a particulate phosphorous reagent in an amount ranging from about 2% to about 25% of the total mixture, (D) a particulate filter aid in an amount ranging from about 2% to about 40% of the total mixture, and (E) a particulate ammonium reagent in an amount ranging from about 2% to about 20% of the total mixture. In embodiments that include a particulate sulfur reagent and a particulate phosphorous reagent, the ratio of particulate sulfur reagent to particulate phosphorous reagent can be from about 5:1 to about 1:2 or from about 4:1 to about 1:3. Embodiments can include one or more of (A) a particulate aluminum reagent in an amount ranging from about 5 to about 5% of the total mixture, (B) a silica reagent in an amount ranging from about 1% to about 20% of the total mixture, (C) a particulate carbonaceous reagent in an amount ranging from about 5% to about 85% of the total mixture, (D) a particulate filter aid in an amount ranging from about 5% to about 50% of the total mixture, (E) a particulate ammonium reagent in an amount ranging from about 2% to about 50% of the total mixture, and (F) a polymer decolorant in an amount ranging from about 10% to about 50% of the total mixture. An exemplary composition includes from about 10% to about 30% of a polymer decolorant in the commercially available state, from about 2% to about 15% of a particulate phosphorous reagent, from about 15% to about 40% of a particulate sulfur reagent, and from about 35% to about 55% of a particulate carbonaceous reagent.

An exemplary composition for use in sugar carbonatation includes a particulate carbonaceous reagent and a polymer decolorant, and optionally includes at least one particulate solid selected from the group consisting of (A) a particulate sulfur reagent (B) a silica reagent, (C) a particulate phosphorous reagent, (D) a particulate aluminum reagent, (E) a particulate filter aid, and (F) a particulate ammonium reagent.

The present invention provides advantages over existing methodologies that have not been previously realized. The invention allows for an increased capacity and throughput in the sugar refining process. This can allow for an increased production per unit time or a decrease in the time required for producing the same amount of sugar. The compositions and processes of the present invention also provide a more highly refined sugar following the clarification process. This can reduce or eliminate the need for additional downstream processes such as ion exchange resin and carbon clarification. Eliminating or reducing the need for downstream processes can reduce refining time, reduce costs for chemicals and provide savings by reducing the need for chemical disposal. Sugars clarified using compositions and methods according to the invention also usually show less turbidity, less insoluble matter, and less color.

Further novel features and other advantages of the present invention will become apparent from the following detailed description, discussion and the appended claims.

DETAILED DESCRIPTION

Although specific embodiments of the present invention will now be described, it should be understood that such embodiments are by way of example only and merely illustrative of but a small number of the many possible specific embodiments which can represent applications of the principles of the present invention. Changes and modifications by persons skilled in the art to which the present invention pertains are within the spirit, scope and contemplation of the present invention as further defined in the appended claims. All references cited herein are incorporated by reference as if each had been individually incorporated.

The present invention includes compositions and methods for improving the carbonatation step in sugar processing. Sugar refining can utilize carbonatation processes in which carbon dioxide gas is bubbled into the sugar liquor or syrup that is pre-treated with lime, usually in a carbonatation saturator. According to the invention, the compositions described herein can be added directly to the carbonated liquor after the last carbonatation saturator, but prior to the filtration of the carbonated liquor. At least some of the compositions can be added at other parts of the refining process as described further below. Most sugar refineries that employ carbonatation operate with two carbonatation saturators in series; therefore in such refineries the compositions are added to the sugar liquor or syrup after the second saturator in series (i.e., the second saturator in series is the "last carbonatation saturator"). If the refinery operates with 3 or 4 carbonatation saturators in series, the "last carbonatation saturator" is the $3^{rd}$ or $4^{th}$ saturator, respectively, and so on for systems with more than 4 carbonatation saturators.

Generally speaking, there are one or more carbonated liquor holding tanks in the refining process that accept the flow from the carbonatation saturators. In these holding tanks (or simply "holding tank", even if there are more than one such holding tanks, in series or parallel) the carbonated liquor is usually stirred to maintain the calcium carbonate crystalline solid in solution, and avoid settling of the calcium carbonate out of solution. The carbonated liquor holding tank usually can hold enough liquor for at least 15 minutes, and frequently 30 to 60 minutes, of process flow. The volume of the holding tank is chosen to serve as a "buffer" zone to keep flow in the refinery steady, even in the event of minor process upsets. When present, the holding tank provides a suitable environment to allow for a suitable mixing and reaction time with the compositions of the present invention. Accordingly, in systems with holding tanks, the compositions of the present invention can be added either directly to the carbonated liquor holding tank, or at some point upstream of the carbonated liquor holding tank but downstream of the last carbonatation saturator. If no carbonated liquor holding tank is used, the compositions can preferably be added anywhere upstream of the first-stage filtration of the carbonated liquor but downstream of the last carbonatation saturator, for example, near the liquor outlet flow of the last carbonatation saturator. Not withstanding the above, the compositions can also be added at any other point in the sugar purification process.

The compositions are mixed intimately into the sugar liquors or syrups, and allowed sufficient time to react with the sugar liquors or syrups so as to impart an improvement in some characteristic of the clarified liquor obtained therefrom. Several compositions have been identified that can be used to improve the carbonatation process. In general, the compositions can include one or more components selected from a particulate sulfur reagent, a particulate phosphorous reagent, a particulate aluminum reagent, a silica reagent, a particulate carbonaceous reagent, a particulate filter aid, a particulate ammonium reagent, and a polymer decolorant. Some of the components of the present compositions have been previously utilized in the sugar refining process. However, it has been found that treatment of sugars that have been through the carbonatation process with the compositions described herein provide superior results and advantages over existing processes.

The term "carbonated liquor" or "carbonated sugar liquor" as used herein refers to the liquor that exits from the last carbonatation saturator and prior to the first filtration step.

The term "sugar liquor" or "sugar syrup" as used herein refers to any liquor or syrup containing a sugar. In exemplary embodiments, the sugar is derived from a plant source, such as, for example, corn, cane or beets. Examples of sugar liquors and/or syrups include solutions of cane or beet sugar liquors or syrups, starch hydrolyzate derived sweeteners such as high-fructose corn syrup and glucose, or others that are used in the art.

The term "polymer decolorant" as defined herein, refers to organic polymers that are frequently classified as a color precipitant for use in sugar solutions, and can typically be a liquid or waxy substance. Any polymer decolorant that can be used in sugar purification processing is acceptable, for example, those that contain a positive charge on a nitrogen atom. Exemplary polymer decolorants include dimethylamine-epichlorohydrin polymers such as Magnafloc LT-31, dimethyldialkylammonium chloride polymers such as Magnafloc LT-35 supplied by Ciba Chemicals, and dimethyl-di-tallow ammonium chloride. The polymer decolorant can be prepared as a diluted solution in water or other suitable solvent; unless otherwise indicated, the weight percent of the polymer decolorant of the mixture is defined herein as the weight percent of the polymer solution added to the mixture, regardless of whether the polymer solution is added in the "as-is commercially available state" (typically 30-50% solids content) or in a "further diluted state" with water or other suitable solvent. If the polymer decolorant is first diluted in water or other suitable solvent, it can be diluted from about 5 to 95% by weight of polymer in the "as-is commercially available state" with respect to the solvent, for example from about 10 to 80% by weight of polymer in the "as-is commercially available state", or from about 40 to 75% by weight of polymer in the "as-is commercially available state", with the balance comprising of water or other suitable solvent. In other examples, the commercially available polymer decolorant can be diluted with water in a ratio of from about 3:1 commercially available decolorant to water to about 1:3 commercially available decolorant to water. For example, polymer decolorant solutions can be prepared by adding about three parts of the commercially available reagent to about one part water, or about 2 parts of the commercially available reagent to about 1 part water, or about 1 part of the commercially available reagent to about 1 part of water, or about 1 part of the commercially available reagent to about 2 parts of water, or about 1 part of the commercially available reagent to about 3 parts of water. Aqueous solutions, for example a sugar solution of a solution containing one or more particulate reagents as described herein, can be used to dilute the commercially available polymer decolorant instead of pure water. Diluting the polymer decolorant from the "as-is commercially available state" can facilitate mixing of the polymer decolorant with various powders according to various embodiments of the present invention.

The term "particulate filter aid" as defined herein, refers to any particulate solid that is generally classified as a filter aid. Any filter aid suitable for use in sugar purification processing is acceptable. Exemplary particulate filter aids include diatomaceous earth or perlite filter aids.

Several compositions of matter have been identified for incorporation in the process of the present invention. The compositions can include one or more components selected from a particulate sulfur reagent, a particulate phosphorous reagent, a particulate aluminum reagent, a silica reagent, a particulate carbonaceous reagent, a particulate filter aid, a particulate ammonium reagent, and a polymer decolorant. Some of the components of the present compositions have been previously utilized in the sugar refining process. However, it has been found that treatment with the compositions provided in the present invention, and according to the processes of the present invention, provides superior results and advantages over existing processes.

In exemplary embodiments, the particle size of in the composition can be in the range of, or have an average particle size in the range of, for example, from about 0.01 micron up to about 300 microns; from about 1 micron to about 300 microns; from about 30 microns to about 300 microns; or from about 50 microns to about 250 microns.

The particulate sulfur reagent is a particulate solid that includes at least one sulfur atom and at least three oxygen atoms in the chemical formula. For example, the solid can include a compound or ion having the formula $S_yO_x$ where y is generally 1-2, and $x \geqq 2.0y$. In exemplary particulate sulfur reagents, when y=1, x is 3 or more, and when y=2, x=4 or more. Examples of particulate sulfur reagents include sulfite ($SO_3^{2-}$) salts, bisulfite ($HSO_3^-$) salts, sulfate ($SO_4^{2-}$) salts, hydrogen sulfate ($HSO_4^-$) salts, metabisulfite ($S_2O_5^{-2}$) salts, hydrosulfite ($S_2O_4^{-2}$) salts, and others. Specific examples include sodium sulfite, ammonium sulfite, sodium bisulfite, sodium metabisulfite, sodium sulfate, sodium bisulfate, and sodium hydrosulfite (sodium dithionite). Persons skilled in the art will recognize additional compounds that are suitable particulate sulfur reagents.

The particulate phosphorous reagent is a particulate solid that includes at least one phosphorous atom and at least three oxygen atoms in the chemical formula. For example, the solid can include a compound or ion having the formula $P_yO_x$ where y is generally 1-2, and $x \geqq 2.0y$. In exemplary particulate phosphorous reagents, when y=1, x is 3 or more, and when y=2, x=4 or more. Examples of particulate phosphorous reagents include hydrogen phosphite ($HPO_3^{2-}$) compounds, monobasic phosphate ($H_2PO_4^{1-}$) compounds, dibasic phosphate compounds ($HPO_4^{2-}$), acid pyrophosphate ($H_2P_2O_7^{2-}$) compounds, and metaphosphate ($PO_3$) compounds. Specific examples include sodium hydrogen phosphite ($Na_2HPO_3$), ammonium hydrogen phosphite, ($(NH_4)_2HPO_3$), sodium phosphate monobasic ($NaH_2PO_4$), calcium phosphate monobasic ($Ca(H_2PO_4)_2$), ammonium phosphate monobasic ($NH_4H_2PO_4$), sodium phosphate dibasic ($Na_2HPO_4$), ammonium phosphate dibasic ($(NH_4)_2HPO_4$), and sodium acid pyrophosphate ($Na_2H_2P_2O_7$). Persons skilled in the art will recognize additional compounds that are suitable particulate phosphorous reagents.

The particulate aluminum reagent is a particulate solid selected from a group of aluminum compounds that comprise of at least one aluminum atom and at least three oxygen atoms in the chemical formula. Specific examples include aluminum ammonium sulfate ($AlNH_4(SO_4)_2$), aluminum hydroxychloride ($Al_2(OH)_5Cl$), aluminum oxide ($Al_2O_3$), aluminum potassium sulfate ($AlK(SO_4)_2$), aluminum sodium sulfate ($AlNa(SO_4)_2$), aluminum sulfate ($Al_2(SO_4)_3$), and various permutations of compounds frequently referred to as polyaluminum chlorides or aluminum chlorohydrates that are designated by the general formula $(Al_nCl_{(3n-m)}(OH)_m$. Persons skilled in the art will recognize additional compounds that are suitable particulate aluminum reagents.

The silica reagent is a particulate solid that is classified as an amorphous silica or as an amorphous silicon dioxide (amorphous $SiO_2$). These silica reagents are sometimes also referred to as "precipitated silica." In embodiments, the silica reagent may be added as a sol gel.

The particulate carbonaceous reagent is a particulate solid that is classified as an activated carbon, and is interchangeably referred to herein as a particulate activated carbon. Any particulate activated carbon can be used; exemplary carbonaceous reagents include decolorizing activated carbons such as acid-activated decolorizing carbons. A particulate carbonaceous reagent can be any particulate carbonaceous reagent suitable for use in a sugar refining process. In exemplary embodiments, the particulate carbonaceous reagent can be in the range of, or have an average particle size in the range of, for example, from about 0.01 micron up to about 300 microns; from about 1 micron to about 300 microns; from about 5 microns to about 250 microns; or from about 50 microns to about 250 microns.

The particulate ammonium reagent is a particulate solid containing a source of ammonium ($NH_4^+$). Specific examples include ammonium bicarbonate ($NH_4HCO_3$), ammonium phosphate dibasic ($(NH_4)_2HPO_4$), ammonium sulfite ($(NH_4)_2SO_3$), ammonium hydrogen phosphite, ($(NH_4)_2HPO_3$), and ammonium phosphate monobasic ($NH_4H_2PO_4$). In some embodiments, the particulate ammonium reagent is a compound that provides a source of ammonium ($NH_4^+$) that obtains a pH in water solution greater than 7.0. Persons skilled in the art will recognize additional compounds that are suitable particulate ammonium reagents.

Compositions according to the invention can be added directly to the carbonated liquor holding tank, if used, or at some point upstream of the first filtration stage of the carbonated liquor but downstream of the last carbonatation saturator, as well as at any point in the sugar purification process. In general, compositions containing multiple constituents can sometimes provide improved results. The compositions can be added to the process as singular components, or they are first prepared as manufactured admixtures and added as a composite to the process. Compositions can also be added by admixing some components before addition and adding other components individually. Examples of compositions within the scope the present invention include:

Exemplary Embodiment (1)

At least one particulate sulfur reagent is added either directly to the carbonated liquor holding tank, or at some point upstream of the carbonated liquor holding tank but downstream of the last carbonatation saturator. Optionally, in addition to the particulate sulfur reagent, the composition can include one or more of the particulate phosphorous reagent, particulate aluminum reagent, silica reagent, particulate carbonaceous reagent, particulate filter aid, a polymer decolorant, and particulate ammonium reagent. In cases where an additional component is present, the sulfur reagent can be present in an amount of from about 1% to about 99% (by weight), for example from about 10 to 99%, or from about 20 to 97% of the composition.

Exemplary Embodiment (2)

A mixture containing at least one particulate sulfur reagent, and at least one particulate phosphorous reagent. In exemplary compositions according to this embodiment, the composition comprises from about 1% to about 99% of the sulfur reagent and from about 99% to about 1% of the phosphorous reagent. In other exemplary embodiments, the composition comprises from about 10% to about 90% of the sulfur reagent and from about 90% to about 10% of the phosphorous reagent. In still further exemplary embodiments, the composition comprises about 75% of the sulfur reagent and about 25% of the phosphorous reagent.

Exemplary Embodiment (3)

A mixture containing at least one particulate sulfur reagent, and at least one particulate aluminum reagent. In exemplary compositions according to this embodiment, the composition comprises from about 1% to about 99% of the sulfur reagent and from about 99% to about 1% of the aluminum reagent. In other exemplary embodiments, the composition comprises from about 10% to about 90% of the sulfur reagent and from about 90% to about 10% of the aluminum reagent. In still further exemplary embodiments, the composition comprises about 85% of the sulfur reagent and about 15% of the aluminum reagent.

Exemplary Embodiment (4)

A mixture containing at least one particulate sulfur reagent, and at least one silica reagent. In exemplary compositions according to this embodiment, the composition comprises from about 1% to about 99% of the sulfur reagent and from about 99% to about 1% of the silica reagent. In other exemplary embodiments, the composition comprises from about 10% to about 95% of the sulfur reagent and from about 90% to about 5% of the silica reagent. In still further exemplary embodiments, the composition comprises about 95% of the sulfur reagent and about 5% of the silica reagent.

Exemplary Embodiment (5)

A mixture containing at least one particulate sulfur reagent, and at least one carbonaceous reagent. In exemplary compositions according to this embodiment, the composition comprises from about 1% to about 99% of the sulfur reagent and from about 99% to about 1% of the carbonaceous reagent. In other exemplary embodiments, the composition comprises from about 10% to about 90% of the sulfur reagent and from about 90% to about 10% of the carbonaceous reagent. In still further exemplary embodiments, the composition comprises about 90% of the sulfur reagent and about 10% of the carbonaceous reagent.

Exemplary Embodiment (6)

A mixture containing at least one particulate sulfur reagent, and at least one particulate filter aid. In exemplary compositions according to this embodiment, the composition comprises from about 1% to about 99% of the sulfur reagent and from about 99% to about 1% of the particulate filter aid. In other exemplary embodiments, the composition comprises from about 10% to about 90% of the sulfur reagent and from about 90% to about 10% of the particulate filter aid. In still further exemplary embodiments, the composition comprises about 75% of the sulfur reagent and about 25% of the particulate filter aid.

Exemplary Embodiment (7)

A mixture containing at least one particulate sulfur reagent, and at least one particulate ammonium reagent. In exemplary compositions according to this embodiment, the composition comprises from about 1% to about 99% of the sulfur reagent and from about 99% to about 1% of the particulate ammonium reagent. In other exemplary embodiments, the composition comprises from about 10% to about 90% of the sulfur reagent and from about 90% to about 10% of the particulate ammonium reagent. In still further exemplary embodiments, the composition comprises about 75% of the sulfur reagent and about 25% of the particulate ammonium reagent.

Exemplary Embodiment (8)

A combination of any of the Embodiments (1) through (7), either as tertiary component mixtures (for example, a combination of at least one particulate sulfur reagent, at least one particulate phosphorous reagent, and at least one silica reagent), or as quaternary component mixtures (for example, a combination of at least one particulate sulfur reagent, at least one particulate phosphorous reagent, at least one silica reagent, and at least one carbonaceous reagent), or as a five-component mixture (for example a combination of at least one particulate sulfur reagent, at least one particulate phosphorous reagent, at least one silica reagent, at least one carbonaceous reagent, and at least one aluminum reagent), or as a six-component mixture (for example a combination of at least one particulate sulfur reagent, at least one particulate phosphorous reagent, at least one silica reagent, at least carbonaceous reagent, at least one aluminum reagent, and at least one particulate filter aid), or as a seven-component mixture (for example a combination of at least one particulate sulfur reagent, at least one particulate phosphorous reagent, at least one silica reagent, at least one carbonaceous reagent, at least one aluminum reagent, at least one particulate filter aid, and at least one particulate ammonium reagent). In any of the compositions of this exemplary embodiment, the composition can comprise from about 1% to about 95% (by weight) of the sulfur reagent, or from about 10 to 90% of the sulfur reagent, or from about 50 to 85% of the sulfur reagent. These compositions can further comprise from about 0% to about 95% (by weight) of the phosphorous reagent, or from about 10 to 90% of the phosphorous reagent, or from about 10 to 30% of the phosphorous reagent. These compositions can further comprise from about 0% to about 95% (by weight) of the aluminum reagent, or from about 5 to 90% of the aluminum reagent, or from about 7 to 20% of the aluminum reagent. These compositions can further comprise from about 0% to about 95% (by weight) of the silica reagent, or from about 3 to 90% of the silica reagent, or from about 2 to 15% of the silica reagent. These compositions can further comprise from about 0% to about 95% (by weight) of the carbonaceous reagent, or from about 5 to 90% of the carbonaceous reagent, or from about 5 to 50% of the carbonaceous reagent. These compositions can further comprise from about 0% to about 95% (by weight) of the particulate filter aid, or from about 5 to 90% of the particulate filter aid, or from about 5 to 50% of the particulate filter aid. These compositions can further comprise from about 0% to 99% (by weight) of the particulate ammonium reagent, or from about 1 to 95% of the ammonium reagent, or from about 3 to 15% of the particulate ammonium reagent.

Exemplary Embodiment (9)

A mixture comprising of at least one particulate carbonaceous reagent, and at least one polymer decolorant. In exemplary compositions according to this embodiment, the composition comprises from about 50% to about 90% (by weight) of the carbonaceous reagent and from about 50% to about 10% (by weight) of the polymer decolorant. In other exemplary embodiments, the composition comprises from about 50% to about 75% of the carbonaceous reagent and from about 50% to about 25% of the polymer decolorant. In still further exemplary embodiments, the composition comprises from about 60% to about 70% of the carbonaceous reagent and from about 40% to about 30% of the polymer decolorant.

Exemplary Embodiment (10)

A mixture of at least one particulate carbonaceous reagent and at least one polymer decolorant, mixed with any combination of one or more of the particulate materials selected from the list of (1) a particulate sulfur reagent, (2) a silica reagent, (3) a particulate aluminum reagent, (4) a particulate phosphorous reagent, (5) a particulate filter aid, or (6) a particulate ammonium reagent. This embodiment would therefore include tertiary, quaternary, five-composite, six-composite, seven-component, and eight-component compositions. In any of these tertiary, quaternary, and five, six, seven, and eight component compositions, according to this embodiment, the composition comprises from about 10% to about 90% (by weight) of the carbonaceous reagent, or from about 20 to 75% of the carbonaceous reagent, or from about 30 to 70% of the carbonaceous reagent. These compositions can further comprise from about 5% to about 45% (by weight) of the polymer decolorant, or from about 10 to 40% of the polymer decolorant, or from about 20 to 40% of the polymer decolorant. These compositions can further comprise from about 0% to about 90% (by weight) of the sulfur reagent, or from about 3 to 75% of the sulfur reagent, or from about 3 to 60% of the sulfur reagent. These compositions can further comprise from about 0% to about 45% (by weight) of the phosphorous reagent, or from about 3 to 30% of the phosphorous reagent, or from about 3 to 20% of the phosphorous reagent. These compositions can further comprise from about 0% to about 45% (by weight) of the aluminum reagent, or from about 3 to 30% of the aluminum reagent, or from about 3 to 20% of the aluminum reagent. These compositions can further comprise from about 0% to about 45% (by weight) of the silica reagent, or from about 3 to 30% of the silica reagent, or from about 2 to 20% of the silica reagent. These compositions can further comprise from about 0% to about 50% (by weight) of the particulate filter aid, or from about 5 to 40% of the particulate filter aid, or from about 10 to 30% of the particulate filter aid. These compositions can further comprise from about 0% to about 45% (by weight) of the ammonium reagent, or from about 2 to 30% of the ammonium reagent, or from about 2 to 20% of the ammonium reagent.

Any combinations of the mixtures of components listed in Exemplary Embodiments (1) through (10) can be utilized in the process of the present invention.

An embodiment can include, for example, a combination of a particulate sulfur reagent and a particulate phosphorous reagent, for example as in Exemplary Embodiment (2) shown above. Although any of the aforementioned particulate sulfur reagents can be used, in exemplary embodiments the particulate sulfur reagent is sodium metabisulfite. Although any of the aforementioned particulate phosphorous reagents can be used, in exemplary embodiments the particulate phosphorous reagent is monosodium phosphate. In such embodiments, the ratio of particulate sulfur reagent to particulate phosphorous reagent can range from about 5:1 to about 1:3, from about 4:1 to about 1:2, from about 4:1 to about 1:1, or from about 4:1 to about 3:2, or about 3:1.

As described herein, other materials can be added to this mixture, for example in the amounts added can be as shown in any of the embodiments described above. In other examples, the final mixture can contain a particulate aluminum reagent in an amount ranging from about 2% to about 25% of the total mixture, 5% to about 25% of the total mixture, from about 2% to about 15% of the total mixture, from about 2% to about 10% of the total mixture, from about 5% to about 20% of the total mixture, 10% to about 20% of the total mixture, about 10% of the total mixture, or about 15% of the total mixture. The final mixture can contain a silica reagent in an amount ranging from about 5% to about 25% of the total mixture, from about 10% to about 20% of the total mixture, from about 1% to about 25% of the total mixture, from about 1% to about 20% of the total mixture from about 2% to about 20% of the total mixture, from about 3% to about 15% of the total mixture, from about 0.5% to about 15% of the total mixture, from about 0.5% to about 10% of the total mixture or about 3% to about 5% of the total mixture. The final mixture can contain a particulate carbonaceous reagent in an amount ranging from about 5% to about 85% of the total mixture, from about 5% to about 50% of the total mixture, from about 5% to about 15% of the total mixture, from about 8% to about 30% of the total mixture, from about 10% to about 20% of the total mixture, from about 8% to about 12% of the total mixture, or about 10% of the total mixture. The final mixture can contain a particulate filter aid in an amount ranging from about 2% to about 50% of the total mixture, from about 2% to about 40% of the total mixture, from about 15% to about 40% of the total mixture, from about 10% to about 30% of the total mixture, from about 20% to about 30% of the total mixture or about 25% of the total mixture. The final mixture can contain a particulate ammonium reagent in an amount ranging from about 2% to about 50% of the total mixture, from about 5% to about 30% of the total mixture, from about 5% to about 30% of the total mixture, from about 20% to about 30% of the total mixture, or from about 5% to about 15% of the total mixture. The final mixture can contain a polymer decolorant in an amount ranging from about 2% to about 60% of the total mixture, about 2% to about 40% of the total mixture, about 20% to about 60% of the total mixture, about 25% to about 50% of the total mixture from about 5% to about 30% of the total mixture, about 10% to about 50% of the total mixture, about 10% to about 40% of the total mixture, or from about 10% to about 25% of the total mixture.

For treating carbonated liquors, compositions comprising a particulate sulfur reagent and a particulate phosphorous reagent as the principle constituents can be added to carbonated liquors at a rate of about 0.1 kg to about 1.0 kg per ton of sugar solids about 0.1 kg to about 0.5 kg per ton of sugar solids, or about 0.2 kg to about 0.4 kg per ton of sugar solids, or about 0.3 kg per ton of sugar solids.

Another exemplary embodiment includes a particulate sulfur reagent, a polymer decolorant and a particulate carbonaceous reagent. Although any of the aforementioned particulate sulfur reagents can be used, in exemplary embodiments the particulate sulfur reagent is sodium metabisulfite. An exemplary polymer decolorant is dimethylamine epichlorohydrin, although any of the previously described polymer decolorants, as well as others, may be used. Similarly, any of the aforementioned particulate carbonaceous reagents can be used, and in exemplary embodiments the particulate carbonaceous reagent is activated carbon. In exemplary embodiments, the polymer decolorant in the as-is commercially available state (typically 30-50% solids content), is first diluted in water. For example, the commercially available polymer decolorant reagent can be diluted with water in a ratio of from about 3:1 commercially available decolorant to water to about 1:3 commercially available decolorant to water. For example, polymer decolorant solutions can be prepared by adding about three parts of the commercially available reagent to about one part water, or about 2 parts of the commercially available reagent to about 1 part water, or about 1 part of the commercially available reagent to about 1 part of water, or about 1 part of the commercially available reagent to about 2 parts of water, or about 1 part of the commercially available reagent to about 3 parts of water. The polymer decolorant, optionally diluted, is combined with the particulate carbonaceous reagent and the particulate sulfur reagent such that the final amount of polymer decolorant in the "as is commercially available state" in this exemplary composition, not including any additional water added for dilution, can range from about 10% to about 40%, from about 15% to about 33% or from about 25% to about 30%. The particulate sulfur reagent can be present in the composition in an amount from about 2% to about 15%, from about 5% to about 15%, from about 3% to about 12%, from about 7% to about 12%, or about 5-10%, exclusive of any additional water added for dilution of the polymer decolorant beyond the "as is commercially available state" of the polymer decolorant. The particulate carbonaceous reagent can be present in the composition in an amount from about 50% to about 75%, from about 60% to about 70%, or about 62% to about 65%, exclusive of any additional water added for dilution of the polymer decolorant beyond the "as is commercially available state" of the polymer decolorant. Stated in terms of the diluted polymer decolorant (by adding additional water to dilute the polymer decolorant beyond the "as is commercially available state"), the composition can contain from about 15% to about 50% of the diluted polymer decolorant, from about 15% to about 40% of the diluted polymer decolorant, from about 25% to about 40% of the diluted polymer decolorant, from about 30% to about 40% of the diluted polymer decolorant, or about 34% of the diluted polymer decolorant; from about 50% to about 75% of the particulate carbonaceous reagent, or from about 55% to about 65% of the particulate carbonaceous reagent or about 58% of the particulate carbonaceous reagent; and from about 1% to about 15% of the particulate sulfur reagent, or from about 2% to about 12% of the particulate sulfur reagent or about 2% to about 8% of the particulate sulfur reagent.

As described herein, other materials can be added to a composition containing a particulate sulfur reagent, a polymer decolorant and a particulate carbonaceous reagent as the principle ingredients to obtain a final concentration of the various reagents, for example in the amounts added can be as shown in any of the embodiments described above, which will obviously alter the total amount of reagents already present, but will not significantly alter the relative amounts of materials already present, i.e. the relative amount of particulate sulfur reagent, polymer decolorant and particulate carbonaceous reagent. For example, the final mixture can contain a particulate aluminum reagent in an amount ranging from about 2% to about 25% of the total mixture, 5% to about 25% of the total mixture, from about 2% to about 15% of the total mixture, from about 2% to about 10% of the total mixture, from about 5% to about 20% of the total mixture, 10% to about 20% of the total mixture, about 10% of the total mixture, or about 15% of the total mixture. The final mixture can contain a silica reagent in an amount ranging from about 5% to about 25% of the total mixture, from about 10% to about 20% of the total mixture, from about 1% to about 25% of the total mixture, from about 1% to about 20% of the total mixture from about 2% to about 20% of the total mixture, from about 3% to about 15% of the total mixture, from about 0.5% to about 15% of the total mixture, from about 0.5% to about 10% of the total mixture or about 3% to about 5% of the total mixture. The final mixture can contain a particulate phosphorous reagent in an amount ranging from about 2% to about 40% of the total mixture, from about 2% to about 25% of the total mixture, from about 2% to about 15% of the total mixture, from about 15% to about 40% of the total mixture, from about 4% to about 20% of the total mixture, or about 5% to about 10% of the total mixture. The final mixture can contain a particulate filter aid in an amount ranging from about 2% to about 50% of the total mixture, from about 2% to about 40% of the total mixture, from about 15% to about 40% of the total mixture, from about 10% to about 30% of the total mixture, from about 20% to about 30% of the total mixture or about 25% of the total mixture. The final mixture can contain a particulate ammonium reagent in an amount ranging from from about 2% to about 50% of the total mixture, from about 5% to about 30% of the total mixture, from about 5% to about 30% of the total mixture, from about 20% to about 30% of the total mixture, or from about 5% to about 15% of the total mixture.

For treating carbonated liquors, a composition containing a particulate sulfur reagent, a polymer decolorant and a particulate carbonaceous reagent as the principle ingredients can be added to carbonated liquors at a rate of about 0.1 kg to about 1.0 kg per ton of sugar solids, or about 0.2 kg to about 0.8 kg per ton of sugar solids, or about 0.3 to about 0.6 kg per ton of sugar solids.

Yet another exemplary embodiment includes a particulate sulfur reagent, a particulate phosphorous reagent, a polymer decolorant and a particulate carbonaceous reagent. Although any of the aforementioned particulate sulfur reagents can be used, in exemplary embodiments the particulate sulfur reagent is sodium metabisulfite. Although any of the aforementioned particulate phosphorous reagents can be used, in exemplary embodiments the particulate phosphorous reagent is monosodium phosphate. An exemplary polymer decolorant is the commercially available dimethylamine epichlorohydrin polymer decolorant, although any of the previously described polymer decolorants, as well as others, may be used. Similarly, any of the aforementioned particulate carbonaceous reagents can be used, and in exemplary embodiments the particulate carbonaceous reagent is activated carbon. In exemplary embodiments, the polymer decolorant, as received in commercial solution, is first diluted in water. For example, the commercially available material can be diluted by adding about 3 parts of the commercially available reagent to about one part water. The polymer decolorant, optionally diluted, is combined with the particulate carbonaceous reagent, the particulate phosphorous reagent and the particulate sulfur reagent such that the final amount of polymer decolorant in the "as is commercially available state" in this exemplary composition, not including any additional water added for dilution, can range from about 15% to about 40%, from about 20% to about 35% or about 30%. Some of the reagents may be premixed prior to combining to form the composition. For example, the particulate phosphorous reagent may be combined with all or part of the particulate sulfur reagent before being combined with the optionally dilute polymer decolorant, carbonaceous reagent and, if previously mixed only in part, the remainder of the particulate sulfur reagent. The particulate phosphorous reagent can be present in the composition in an amount from about 3% to about 15%, from about 5% to about 10%, or about 7% exclusive of any additional water added for dilution of the polymer decolorant beyond the "as is commercially available state" of the polymer decolorant. The particulate sulfur reagent can be present in the composition in an amount from about 15% to about 40%, from about 22% to about 32%, or about 27% to about 29%, exclusive of any additional water added for dilution of the polymer decolorant beyond the "as is commercially available state" of the polymer decolorant. The particulate carbonaceous reagent can be present in the composition in an amount from about 35% to about 55%, from about 40% to about 50%, or about 45%, exclusive of any additional water added for dilution of the polymer decolorant beyond the "as is commercially available state" of the polymer decolorant.

As described herein, other materials can be added to a composition containing a particulate sulfur reagent, a particulate phosphorous reagent, a polymer decolorant and a particulate carbonaceous reagent as the principle ingredients by beginning with the composition as described above and adding other reagents, for example in the amounts added can be as shown in any of the embodiments described above, to obtain a final concentration of the various reagents, which will obviously alter the total amount of reagents already present, but will not significantly alter the relative amounts of components already present, i.e. the amounts of particulate sulfur reagent, particulate phosphorous reagent, polymer decolorant and particulate carbonaceous reagent relative to one another. For example, the final mixture can contain a particulate aluminum reagent in an amount ranging from about 1% to about 25% of the total mixture, in an amount ranging from about 2% to about 15% of the total mixture, or about 2 to about 5% of the total mixture. The final mixture can contain a silica reagent in an amount ranging from about 1% to about 25% of the total mixture, in an amount ranging from about 2% to about 20% of the total mixture, or about 2% to about 5% of the total mixture. The final mixture can contain a particulate filter aid in an amount ranging from about 2% to about 50% of the total mixture, in an amount ranging from about 2% to about 25% of the total mixture, or about 10 to about 25% of the total mixture. The final mixture can contain a particulate ammonium reagent in an amount ranging from about 1% to about 50% of the total mixture, in an amount ranging from about 2% to about 25% of the total mixture, or about 3 to about 10% of the total mixture.

For treating carbonated liquors, a composition containing a particulate sulfur reagent, a particulate phosphorous reagent, a polymer decolorant and a particulate carbonaceous reagent as the principle ingredients can be added to carbonated liquors at a rate of about 0.1 kg to about 1.5 kg per ton of sugar solids, or about 0.2 kg to about 1.0 kg per ton of sugar solids, or about 0.5 to about 0.8 kg per ton of sugar solids.

The compositions of the invention are added to the sugar liquor or syrup by way of a solids dosing method added directly to the sugar process (continuous or batch solids dosing using, e.g., a screw conveyor), or a liquid dosing method wherein one or more of the compositions are first added to water (or other suitable liquid, such as sugar liquor, sugar syrup, or a liquid or diluted polymer decolorant), and pumped into the sugar process. As used herein, liquid includes slurries, suspensions and solutions. Other suitable means of adding a solid and /or a liquid can also be used. In some embodiments where both a solid and a liquid are added, some components can be added by solid dosing while others are added by pumping. The present invention relates to adding the compositions according to the present invention either directly to the carbonated liquor holding tank, or at some point downstream of the last carbonatation saturator but prior to the first filtration stage of the carbonated liquor. The compositions can also be added at any point in the sugar purification process. In some embodiments, the compositions have at least some contact time with the sugar liquor or syrup prior to reaching the first filtration stage of the carbonated liquor. For example, the compositions can have at least about 5 minutes of contact time with the sugar liquor or syrup prior to reaching the first filtration stage of the carbonated liquor, and at least about 10 minutes of contact time with the sugar liquor or syrup prior to reaching the first filtration stage of the carbonated liquor.

EXAMPLES

The following examples illustrate some compositions, usage methods, and advantages as described heretofore. The examples are illustrations of point only, and are not intended to limit the scope of our invention.

Example 1

A diluted polymer decolorant solution was first prepared by diluting a commercially available dimethylamine-epichlorohydrin polymer decolorant into a 73% by weight polymer decolorant (in the as-is commercially available state) and 27% water (by weight) solution. A composition (designated as "Composition #1" hereafter) was prepared comprising of 58% powder activated carbon, 8% sodium metabisulfite ($Na_2S_2O_5$), and 34% of the diluted polymer decolorant solution. Composition #1 was added to the carbonated liquor holding tank at a cane sugar refinery, and contacted with the carbonated liquor for approximately 20 minutes prior to the sugar reaching the filtration stage of the carbonated liquor. A dosage of 0.4 kg of Composition #1 per ton of sugar solids in the carbonated liquor yielded the following improvements in purity compared to the traditional Carbonatation process:

TABLE 1

Purity of filtered liquor utilizing Composition #1 compared to the traditional Carbonatation process filtered liquor

| Process Method | Filtered Carbonated Liquor Color | Filtered Carbonated Liquor Turbidity | Filtered Carbonated Liquor Insoluble matter |
|---|---|---|---|
| Composition #1 plus Carbonatation | 308 IU | 0.8 NTU | 9 ppm |
| Traditional Carbonatation | 439 IU | 12 NTU | 15 ppm |

As seen in Table 1, significant reductions of color, turbidity, and insoluble matter were achieved with the use of Composition #1 of the present invention, compared to the results obtained in the traditional Carbonatation process. Each of these 3 parameters are important measures of purity of the filtered carbonated liquor.

Example 2

A composition (designated as "Composition #2" hereafter) was prepared comprising of 75% sodium metabisulfite ($Na_2S_2O_5$) and 25% monosodium phosphate ($NaH_2PO_4$). Composition #2 was added to the carbonated liquor holding tank at a cane sugar refinery, and contacted with the carbonated liquor for approximately 20 minutes prior to the sugar reaching the filtration stage of the carbonated liquor. A dosage of 0.3 kg of Composition #2 per ton of sugar solids in the carbonated liquor yielded the following improvements in purity compared to the traditional Carbonatation process.

TABLE 2

Purity of filtered liquor utilizing Composition #2 compared to the traditional Carbonatation process filtered liquor

| Process Method | Filtered Carbonated Liquor Color | Filtered Carbonated Liquor Turbidity | Filtered Carbonated Liquor Insoluble matter |
|---|---|---|---|
| Composition #2 plus Carbonatation | 370 IU | 1.7 NTU | 2 ppm |
| Traditional Carbonatation | 453 IU | 7.9 NTU | 32 ppm |

As seen in Table 2, significant reductions of color, turbidity, and insoluble matter were achieved with the use of Composition #2 of the present invention, compared to the results obtained in the traditional Carbonatation process.

Example 3

A combination of 0.5 kg of Composition #1 per ton of sugar, and 0.2 kg Composition #2 per ton of sugar was added to the carbonated liquor holding tank at a cane sugar refinery, and contacted with the carbonated liquor for approximately 20 minutes prior to the sugar reaching the filtration stage of the carbonated liquor. The combination of Composition #1 and #2 yielded the following improvements in purity compared to the traditional Carbonatation process:

TABLE 3

Purity of filtered liquor utilizing combination of Composition #1 and #2 compared to the traditional Carbonatation process filtered liquor

| Process Method | Filtered Carbonated Liquor Color | Filtered Carbonated Liquor Turbidity | Filtered Carbonated Liquor Insoluble matter |
|---|---|---|---|
| Composition #1 and #2 plus Carbonatation | 157 IU | 0.8 NTU | 1 ppm |
| Traditional Carbonatation | 279 IU | 7.5 NTU | 38 ppm |

As seen in Table 3, significant reductions of color, turbidity, and insoluble matter were achieved with the use of a combination of Compositions #1 and #2 of the present invention, compared to the results obtained in the traditional Carbonatation process. In addition to the improvement in filtered carbonated liquor purity, an improvement in filtration of the carbonated liquor was observed. After 2 hours of filtration, the process utilizing Compositions #1 and #2 plus Carbonatation yielded a flow of 58 $m^3$/hour at 1.3 bar pressure; the normal Carbonatation-only process yielded a flow of only 42 $m^3$/hr at 2.6 bar pressure after 2 hours. The improved filtration can enable increased daily sugar production for the sugar refinery, an important factor in the daily profitability of the refining process.

The present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the composition or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A process for treating a carbonated liquor in a sugar refining process comprising adding to a sugar syrup or carbonated liquor a composition comprising from about 15% to about 50% of a polymer decolorant in the commercially available state;

from about 50% to about 75% of a particulate carbonaceous reagent;

from about 1% to about 15% of at least one particulate sulfur reagent containing at least one sulfur atom and at least three oxygen atoms in the chemical formula; and optionally one or more particulate solids selected from the group consisting of (A) a silica reagent, (B) a particulate phosphorous reagent containing at least one phosphorous atom and at least three oxygen atoms in the chemical formula, (C) a particulate aluminum reagent containing at least one aluminum atom and at least three oxygen atoms in the chemical formula, (D) a particulate filter aid, and (E) a particulate ammonium reagent having at least one ammonium group ($NH_4$) in the chemical formula.

2. The process according to claim 1, wherein the composition is added before filtration of the carbonated liquor.

3. The process according to claim 1, wherein the composition is added after the final carbonatation saturator.

4. The process according to claim 1, wherein the composition is added to the carbonated liquor in a carbonated liquor holding tank.

5. The process according to claim 1, wherein the composition is added as one of (a) singular components, (b) a combination of singular components and a premixture of components or (c) a pre-manufactured mixture composition.

6. A composition for use in sugar refining, comprising from about 15% to about 50% of a polymer decolorant in the commercially available state;

from about 50% to about 75% of a particulate carbonaceous reagent;

from about 1% to about 15% of at least one particulate sulfur reagent containing at least one sulfur atom and at least three oxygen atoms in the chemical formula; and optionally one or more particulate solids selected from the group consisting of (A) a silica reagent, (B) a particulate phosphorous reagent containing at least one phosphorous atom and at least three oxygen atoms in the chemical formula, (C) a particulate aluminum reagent containing at least one aluminum atom and at least three oxygen atoms in the chemical formula, (D) a particulate filter aid, and (E) a particulate ammonium reagent having at least one ammonium group ($NH_4$) in the chemical formula.

7. The composition of claim 6, comprising from about 30% to about 40% of a polymer decolorant solution, wherein the polymer decolorant solution comprises about 10 to 85% of the polymer decolorant in the commercially available state with the balance comprising water or other suitable solvent, from about 55% to about 65% of the particulate carbonaceous reagent, and from about 2% to about 12% of the particulate sulfur reagent.

8. The composition of claim 6 or 7, comprising one or more components selected from the group consisting of (A) a particulate aluminum reagent in an amount ranging from about 2% to about 15%, (B) a silica reagent in an amount ranging from about 1% to about 20% of the total mixture, (C) a particulate phosphorous reagent in an amount ranging from about 2% to about 45% of the total mixture, (D) a particulate filter aid in an amount ranging from about 2% to about 40% of the total mixture, and (E) a particulate ammonium reagent in an amount ranging from about 2% to about 20% of the total mixture.

9. A process for treating a carbonated liquor in a sugar refining process comprising adding to a sugar syrup or carbonated liquor a composition comprising at least one particulate sulfur reagent containing at least one sulfur atom and at least three oxygen atoms in the chemical formula;

a particulate phosphorous reagent containing at least one phosphorous atom and at least three oxygen atoms in the chemical formula; and optionally one or more particulate solids selected from the group consisting of (A) a silica reagent, (B), a particulate carbonaceous reagent, (C) a particulate aluminum reagent containing at least one aluminum atom and at least three oxygen atoms in the chemical formula, (D) a particulate filter aid, (E) a polymer decolorant, and (F) a particulate ammonium reagent having at least one ammonium group ($NH_4$) in the chemical formula, wherein the ratio of particulate sulfur reagent to particulate phosphorous reagent is from about 5:1 to about 1:3.

10. A composition for use in sugar refining comprising at least one particulate sulfur reagent containing at least one sulfur atom and at least three oxygen atoms in the chemical formula;

a particulate phosphorous reagent containing at least one phosphorous atom and at least three oxygen atoms in the chemical formula; and optionally one or more particulate solids selected from the group consisting of (A) a silica reagent, (B), a particulate carbonaceous reagent, (C) a particulate aluminum reagent containing at least one aluminum atom and at least three oxygen atoms in the chemical formula, (D) a particulate filter aid, (E) a polymer decolorant, and (F) a particulate ammonium reagent having at least one ammonium group ($NH_4$) in the chemical formula, wherein the ratio of particulate sulfur reagent to particulate phosphorous reagent is from about 5:1 to about 1:3.

11. The composition of claim 10, wherein the ratio of particulate sulfur reagent to particulate phosphorous reagent is from about 4:1 to about 1:3.

12. The composition of claim 10 or 11, comprising one or more components selected from the group consisting of (A) a particulate aluminum reagent in an amount ranging from about 1 to about 5% of the total mixture, (B) a silica reagent in an amount ranging from about 1% to about 20% of the total mixture, (C) a particulate carbonaceous reagent in an amount ranging from about 5% to about 85% of the total mixture, (D) a particulate filter aid in an amount ranging from about 5% to about 50% of the total mixture, (E) a particulate ammonium reagent in an amount ranging from about 2% to about 50% of the total mixture, and (F) a polymer decolorant in an amount ranging from about 10% to about 50% of the total mixture.

13. The composition of claim 10, wherein the ratio of particulate sulfur reagent to particulate phosphorous reagent is from about 4:1 to about 1:3.

14. A composition for use in sugar refining comprising from about 10% to about 30% of a polymer decolorant in the commercially available state;

from about 2% to about 15% of a particulate phosphorous reagent containing at least one phosphorous atom and at least three oxygen atoms in the chemical formula;

from about 10% to about 40% of at least particulate sulfur reagent containing at least one sulfur atom and at least three oxygen atoms in the chemical formula;

from about 35% to about 55% of a particulate carbonaceous reagent; and optionally one or more particulate solids selected from the group consisting (A) a silica reagent, (B) a particulate aluminum reagent containing at least one aluminum atom and at least three oxygen atoms in the chemical formula, (C) a particulate filter aid, and (D) a particulate ammonium reagent having at least one ammonium group ($NH_4$) in the chemical formula.

15. The composition of any one of claim 6, 10 or 14, comprising a particulate ammonium reagent.

16. The process according to claim 9, wherein the composition is added before filtration of the carbonated liquor.

17. The process according to claim 9, wherein the composition is added after the final carbonatation saturator.

18. The process according to claim 9, wherein the composition is added to the carbonated liquor in a carbonated liquor holding tank.

19. The process according to claim 9, wherein the composition is added as one of (a) singular components, (b) a combination of singular components and a premixture of components or (c) a pre-manufactured mixture composition.

20. A process for treating a carbonated liquor in a sugar refining process comprising adding to a sugar syrup or carbonated liquor a composition comprising from about 10% to about 30% of a polymer decolorant in the commercially available state;

from about 2% to about 15% of a particulate phosphorous reagent containing at least one phosphorous atom and at least three oxygen atoms in the chemical formula;

from about 15% to about 40% of at least one particulate sulfur reagent containing of at least one sulfur atom and at least three oxygen atoms in the chemical formula;

from about 35% to about 55% of a particulate carbonaceous reagent; and optionally one or more particulate solids selected from the group consisting (A) a silica reagent, (B) a particulate aluminum reagent containing at least one aluminum atom and at least three oxygen atoms in the chemical formula, (C) a particulate filter aid, and (D) a particulate ammonium reagent having at least one ammonium group ($NH_4$) in the chemical formula.

21. The process according to claim 20, wherein the composition is added before filtration of the carbonated liquor.

22. The process according to claim 20, wherein the composition is added after the final carbonatation saturator.

23. The process according to claim 20, wherein the composition is added to the carbonated liquor in a carbonated liquor holding tank.

24. The process according to claim 20, wherein the composition is added as one of (a) singular components, (b) a combination of singular components and a premixture of components or (c) a pre-manufactured mixture composition.

* * * * *